United States Patent
Kanbe et al.

(10) Patent No.: US 7,267,894 B2
(45) Date of Patent: *Sep. 11, 2007

(54) MAGNETIC RECORDING MEDIUM AND MAGNETIC RECORDING APPARATUS

(75) Inventors: Tetsuya Kanbe, Fujisawa (JP); Tatsuya Hinoue, Fujisawa (JP); Yotsuo Yahisa, Fujisawa (JP); Hidekazu Kashiwase, Fujisawa (JP); Hiroyuki Suzuki, Fujisawa (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 693 days.

This patent is subject to a terminal disclaimer.

(21) Appl. No.: 10/656,746

(22) Filed: Sep. 4, 2003

(65) Prior Publication Data

US 2004/0072022 A1     Apr. 15, 2004

(30) Foreign Application Priority Data

Sep. 19, 2002   (JP)   ............................. 2002-272429

(51) Int. Cl.
    G11B 5/66    (2006.01)
    G11B 5/70    (2006.01)

(52) U.S. Cl. .................................... 428/831.2
(58) Field of Classification Search .............. 428/831.2
    See application file for complete search history.

(56) References Cited

U.S. PATENT DOCUMENTS

| | | | |
|---|---|---|---|
| 5,693,426 A | 12/1997 | Lee et al. | |
| 5,830,584 A | 11/1998 | Chen et al. | |
| 6,404,604 B2 * | 6/2002 | Odai et al. ................... | 360/320 |
| 6,506,508 B1 * | 1/2003 | Yoshida et al. ............. | 428/831 |
| 6,537,684 B1 * | 3/2003 | Doerner et al. ............. | 428/611 |
| 6,964,819 B1 * | 11/2005 | Girt et al. ................... | 428/828 |
| 2005/0142389 A1 * | 6/2005 | Hinoue et al. ......... | 428/694 TS |

FOREIGN PATENT DOCUMENTS

| | | |
|---|---|---|
| JP | 04-188427 | 7/1992 |
| JP | 08-212531 | 8/1996 |
| JP | 2001-209927 | 8/2001 |
| JP | 2002-260207 A | 9/2002 |

OTHER PUBLICATIONS

Abarra et al., "Longitudinal magnetic recording media with thermal stabilization layers," Appl. Phys. Lett. 77:2581-2583 (2000).

(Continued)

*Primary Examiner*—Holly Rickman
(74) *Attorney, Agent, or Firm*—Townsend and Townsend and Crew LLP

(57) ABSTRACT

A magnetic recording apparatus including a drive unit to drive the magnetic recording medium, a compound-type magnetic head, a means to move the magnetic head relative to the magnetic recording medium, and a means to process recording and retrieving signals generated by the magnetic head. The magnetic recording medium comprises a non-magnetic substrate and a magnetic layer formed thereon with three underlayers interposed inbetween. The magnetic layer is composed of a plurality of layers of Co-based alloy of hexagonal close-packed structure which are antiferromagnetically coupled to one another through a non-magnetic intermediate layer, said three underlayers including an amorphous alloy layer, a Ta layer, and a Cr-based alloy layer of body-centered cubic structure.

10 Claims, 6 Drawing Sheets

OTHER PUBLICATIONS

Fullerton et al., "Antiferromagnetically coupled magnetic media layers for thermally stable high-density recording," Appl. Phys. Lett. 77:3806-3808 (2000).

Lee et al. "MgO seed layers for CoCrPt/Cr longitudinal magnetic recording media," Appl. Phys. Lett. 67:3638-3640 (1995).

* cited by examiner

MAGNETIC RECORDING MEDIUM AND MAGNETIC RECORDING APPARATUS

BACKGROUND OF THE INVENTION

1. Field of the Invention

The present invention relates to a magnetic recording apparatus, and to a magnetic recording medium particularly used for a magnetic recording apparatus.

2. Description of Related Art

The rapidly growing IT industry increases the demand for magnetic disc units with a larger capacity than ever before. This demand stimulates the development of a highly sensitive magnetic head and a recording medium with a high S/N ratio. For improving S/N ratio of a recording medium, the recording medium should have an improved retrieving output for high-density recording. In general, a recoding medium is composed of a substrate, a first underlayer (called a seed layer), a second underlayer made of Cr-based alloy which has a body-centered cubic structure, a magnetic layer, and a carbon protective layer, which are sequentially formed one over another. The magnetic layer is formed from a Co-based alloy of hexagonal close-packed structure, such as CoCrPtB and CoCrPtTa. Improvement in retrieving output is accomplished if the magnetic layer has its (11·0) or (10·0) plane oriented approximately parallel to the substrate surface so that the c-axis (which is the easy axis of magnetization) coincides with the longitudinal direction of the magnetic layer. It is known that the crystal orientation in the magnetic layer is determined by the seed layer. There are reports saying that the (11·0) plane orients as desired if the seed layer is formed from Ta (which is disclosed in Japanese published applications JPA 4-188427, JPA8-212531 and Japanese patent JP3298893) or MgO (disclosed in Appl. Phys. Lett., vol. 67, pp. 3638-3640, December (1993)) and that the (10·0) plane orients as desired if the seed layer is formed from NiAl ally of B2 structure (disclosed in Japanese patent JP5693426). Moreover, it is known that improvement in retrieving output is achieved if the substrate surface is mechanically texturized so that anisotropic magnetization takes place in the circumferential direction. Texturizing used to be applied mostly to an Al—Mg alloy substrate coated with an NiP plating film. However, texturizing is also applied to a glass substrate to create magnetic anisotropy (disclosed in Japanese published application JPA 2001-209927).

Not only improvement in retrieving out but reduction in medium noise is also important for the medium to have a high S/N ratio. Reduction in medium noise is effectively accomplished if the magnetic layer is formed from finer particles or the magnetic layer has a smaller value of $B_r \cdot t$, which is the product of the remanent magnetic flux density ($B_r$) of the magnetic layer and the thickness (t) of the magnetic layer. However, noise reduction in this manner is limited because an extreme reduction in particle size or $B_r \cdot t$ value aggravates thermal stability. There has recently been proposed an antiferromagnetically coupled recording medium which achieves noise reduction without adverse effect on thermal stability (disclosed in Appl. Phys. Lett., vol. 77, pp. 2581-2583, October (2000) and Appl. Phys. Lett., vol. 77, pp. 3806-3808, December (2000)). This magnetic recording medium has two magnetic layers which are antiferromagnetically coupled to each other, with an Ru intermediate layer interposed between them. As compared with the recording medium of single-layer magnetic layer, it has a lower $B_r \cdot t$ value while the magnetic layer remains thick. This is the reason why it has a reduced noise level while keeping good thermal stability.

Notwithstanding the foregoing technologies combined together, it is still impossible to realize an areal recording density in excess of 70 megabits/mm² and it is further reduce medium noise.

Accordingly, what is needed is a recording medium with high S/N ratio, which has high recording density and at the same time reliable.

SUMMARY

In a preferred embodiment, the invention provides a magnetic disk drive capable of high recording density. In accordance with one aspect of the present invention, a magnetic recording medium has a high medium S/N ratio and remains sufficiently stable to thermal fluctuation. The invention also provides a highly reliable magnetic recording apparatus which achieves an areal recording density in excess of 70 megabits/mm² when said magnetic recording medium is used for recording and retrieving under optimal conditions in combination with a highly sensitive magnetic head.

The present invention to attain the above-mentioned object is directed to a longitudinal recording medium which comprises a non-magnetic substrate and a magnetic layer formed thereon with three underlayers interposed between them, said magnetic layer being composed of a plurality of layers of Co-based alloy of hexagonal close-packed structure which are antiferromagnetically coupled to one another through a non-magnetic intermediate layer, said three underlayers including a first one of amorphous alloy, a second one of Ta, and a third one of Cr-based alloy of body-centered cubic structure.

The present invention is based on the inventors' finding that a recording medium has a strong (11·0) orientation if it is composed of a substrate and a magnetic layer formed thereon, with a first underlayer of amorphous alloy, a Ta layer, and a Cr alloy layer interposed between them. The present invention is also based on the inventors' finding that the magnetic recording medium constructed as mentioned above exhibits strong magnetic anisotropy in the circumferential direction if the magnetic layer is formed on a substrate whose surface is texturized in the circumferential direction. The amorphous alloy for a first underlayer should be one which is composed of Co as the principal component and at least one element selected from Zr, Ta, Nb, Ti, W, Mo, B, and Si in a total amount no less than 5 at % (which stands for atom percent) and no more than 60 at %, one which is composed of Ni as the principal component and at least one element selected from Ta, Nb, Zr, Ti, and P in a total amount no less than 5 at % and no more than 60 at %, one which is composed of Cr as the principal component and at least one element selected from Ti, Zr, Ta, B, and Si in a total amount no less than 5 at % and no more element selected from Nb, Zr, Ta, Mo, and Ti as the principal component and Si in an amount no less than 5 at % and no more than 50 at %. The alloy is referred to as amorphous if it gives an X-ray diffraction pattern lacking distinct diffraction peaks except for halo patterns or if it is composed of fine particles having an average particle diameter no larger than 5 nm which is obtained from the lattice fringe image photographed under a high-resolution electron microscope. The content of additional elements should be within the specified range; otherwise, the amorphous alloy tends to become crystalline. In the case of an amorphous alloy for a first underlayer which is composed mainly of Co, it may be incorporated with Cr, V, or Mn so as to reduce or prevent its magnetization. Any other alloy than mentioned above may be used for a first underlayer so long as it has the amorphous structure. An alloy of B2 structure (such as Ni-50 at % Al), which is not amorphous, may also be used for a first underlayer. It produces the same effect as the amorphous alloy. A first underlayer mentioned above is coated with a second underlayer of Ta so that a third underlayer formed thereon from Cr-based alloy of body-centered cubic structure orients in the (100) direction. The Ta film should be 1-10 nm thick for its strong orientation. The tendency toward orientation can be enhanced if the surface of the Ta layer after layer formation.

The material for a third underlayer is not specifically restricted so long as it is an alloy of body-centered cubic structure composed mainly of Cr, such as CrTi, CrMo, and CrW. It is also possible to form a third underlayer from two or more layers of these alloys. CrTiB alloy for a third underlayer is particularly preferable because it permits the magnetic layer to be composed of fine particles, which contributes to reduction in medium noise.

The magnetic layer may be composed of a magnetic layer (or a lower magnetic layer) adjacent to the substrate and a magnetic layer (or an upper magnetic layer) adjacent to the protective layer, said two magnetic layers being antiferromagnetically coupled to each other, with an intermediate layer of Ru interposed between them. The upper and lower magnetic layers are not specifically restricted so long as they are formed from a Co-based alloy of hexagonal closed-pack structure. Moreover, the magnetic layer may be composed of three or more layers of Co-based alloy, with a non-magnetic intermediate layer interposed between them. The non-magnetic intermediate layer is not specifically restricted so long as it is formed from a non-magnetic material.

The substrate may be a glass substrate, an Al—Mg alloy substrate coated with NiP plated film, or a ceramic substrate. Texturizing to form concentric grooves on the surface of the substrate causes the magnetic layer to have a coercive force which is larger in the circumferential direction than in the radial direction. This contributes to the output resolution. Texturizing may be performed on the surface of the substrate either directly or indirectly after a first or second underlayer has been formed.

The above-mentioned magnetic recording medium is combined with a compound-type magnetic head including a recording magnetic head of electromagnetic induction type and a retrieving magnetic head of spin valve type so as to provide a highly reliable magnetic recording apparatus having an areal recording density in excess of 70 megabits/mm$^2$, to which the present invention is also directed.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 1 is a schematic diagram showing one example of the sectional structure of the magnetic recording medium according to the present invention.

FIG. 2 is a hysteresis curve of the recording medium according to one embodiment of the present invention.

FIG. 3 is an X-ray diffraction spectrum of the recording medium according to one embodiment of the present invention.

FIG. 4 is an X-ray diffraction spectrum of a first underlayer used in one embodiment of the present invention.

FIG. 5 is a histogram showing the distribution of the particle diameters of particles constituting the magnetic layer in one embodiment of the present invention.

FIG. 6 is a graph showing the change with time of retrieving output which is observed in the recording medium according to one embodiment of the present invention.

FIG. 7 is a perspective view showing one example of the magnetic recording apparatus according to the present invention.

FIG. 8 is a perspective view showing one example of the sectional structure of the magnetic head used in the magnetic recording apparatus according to the present invention.

FIG. 9 is a schematic diagram showing one example of the sectional structure of the magneto-resistive sensor of the magnetic head used in the magnetic recording apparatus according to the present invention.

DESCRIPTION OF ILLUSTRATIVE EMBODIMENTS

The examples of the invention will be explained below with reference to the accompanying drawings.

EXAMPLE 1

Figure 1:
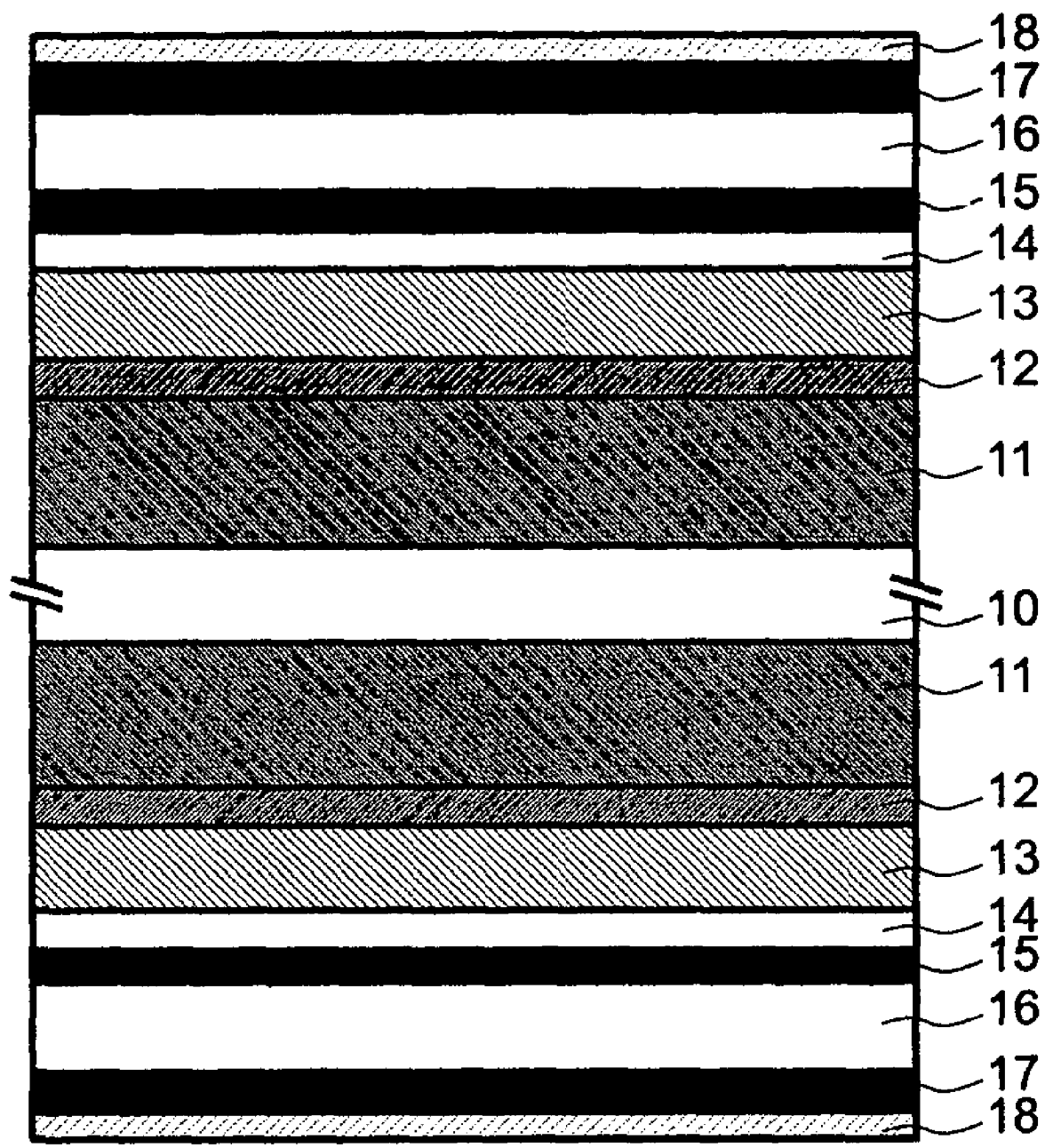
[FIG. 1]

The magnetic recoding medium as one example of the present invention has a sectional structure shown in FIG. 1. It includes a substrate 10 of aluminosilicate glass with a chemically reinforced surface and several layers formed thereon in the following manner. On the substrate, which has been cleaned with alkali and dried, are formed at room temperature a first underlayer 11 of Ni alloy (30 nm thick) and a second underlayer 12 of Ta (2 nm thick). The Ni alloy is Ni-45 at % Ta, Ni-35 at % Nb, Ni-35 at % Zr, Ni-20 at % P, Ni-50 at % Ti, or Ni-20 at % Cr-10 at % Zr. With the substrate heated at about 240° C. by a lamp heater, a third underlayer 13 (10 nm thick) is formed from Cr-15 at % Ti-5 at % B alloy. On the top of the underlayers are sequentially formed a lower magnetic layer 14 (3.8 nm thick) of Co-16 at % Cr-6 at % Pt alloy, an intermediate magnetic layer 15 (0.6 nm thick) of Ru, and an upper magnetic layer 16 (17.2 nm thick) of Co-18 at % Cr-12 at % Pt-8 at % B alloy. The top of the magnetic layers is covered with a carbon protective layer 17 (3.2 nm thick). Finally, the protective layer is coated with a lubricant composed mainly of perfluoroalkylpolyether which forms a lubricant layer 18 (1.8 nm thick). Incidentally, the above-mentioned multilayered films were formed by using a single-wafer sputtering apparatus (MDP 250B) available from Intevac Corporation. The sputtering apparatus was evacuated to 1.0-1.2×10$^{-5}$ Pa and run so that the cycle time was 9 seconds. Sputtering was carried out in argon at 0.93 Pa to form all the layers except for the carbon protective film, which was formed in argon containing 10% nitrogen.

TABLE 1

| Sample No. | First underlayer | $H_c$ (kA/m) | $B_r \cdot t$ (T-nm) | $H_x$ (kA/m) | Resolution (%) | Normalized noise ($mV_{rms}/mV_{pp}$) | Medium S/N (dB) |
|---|---|---|---|---|---|---|---|
| 101 | Ni-45 Ta | 303 | 4.1 | 53 | 51 | 0.0342 | 23.5 |
| 102 | Ni-35 Nb | 275 | 4.2 | 52 | 54 | 0.0388 | 22.9 |
| 103 | Ni-35 Zr | 309 | 4.1 | 50 | 51 | 0.0395 | 22.2 |
| 104 | Ni-20 P | 291 | 4.3 | 53 | 53 | 0.0397 | 22.5 |
| 105 | Ni-30 Ti | 312 | 4.0 | 52 | 52 | 0.0367 | 23.0 |
| 106 | Ni-20 Cr-10 Zr | 317 | 3.9 | 49 | 51 | 0.0398 | 22.2 |

Composition in terms of atomic %.

Figure 2:
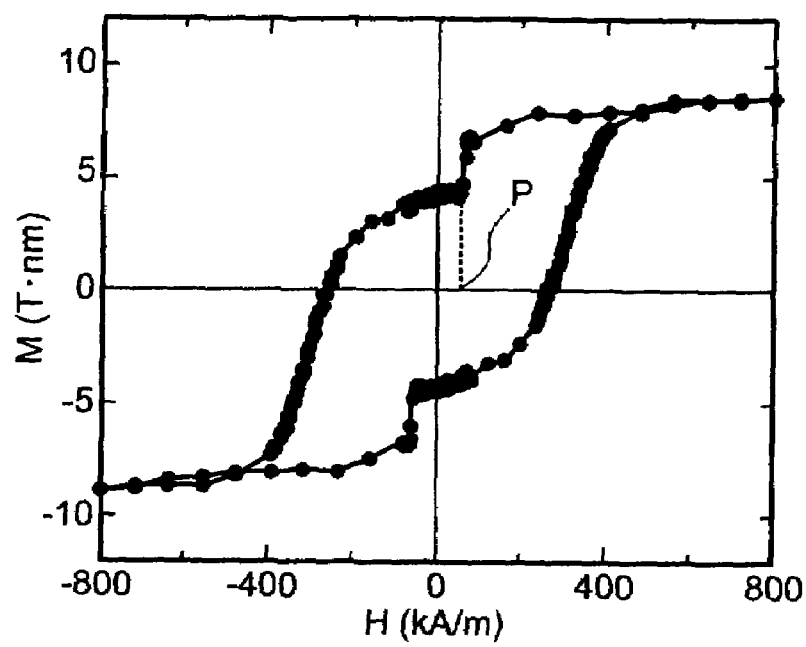
[FIG. 2]

This example gave samples of the recording medium which possess the magnetic characteristics and recording-retrieving characteristics as shown in Table 1. The magnetic characteristics were evaluated at room temperature by using a vibrating sample magnetometer (VSM), with a magnetic field (796 kA/m at maximum) applied in the circumferential direction. The recording-retrieving characteristics were evaluated by using a compound head including a GMR head and a writing head, the former having a shield gap length (Gs) of 94 nm and a read track width (Twr) of 320 nm, the latter having a gap length (Gl) of 140 nm and a track width (Twr) of 420 nm. As a result, any medium had a coercive force of 270 kA/m or more. The recording medium designated as sample No. 101 gave a magnetization curve as shown in FIG. 2. It should be noted that the curve has a step which indicates that the lower magnetic layer undergoes magnetization reversal when the applied magnetic field exceeds about 53 kA/m. The magnetic field (indicated by point P in the figure) that gives rise to the step is defined as the coupled magnetic field ($H_x$). All the samples in this example gave positive values of $H_x$. This suggests that the upper magnetic layer and the lower magnetic layer are antiferromagnetically coupled to each other and that magnetization of the lower magnetic layer (in the state of remanent magnetization) is antiparallel magnetization of the upper magnetic layer. The foregoing leads to a conjecture that the recording medium in this example has the remanent magnetization $B_r \cdot t$ which is represented approximately by $B_r \cdot t = B_{r1} \cdot t_1 - B_{r2} \cdot t_2$, where $B_{r1}$ and $t_1$ denote respectively the remanent magnetic flux density and film thickness of the upper magnetic layer, and $B_{r2}$ and $t_2$ denote respectively the remanent magnetic flux density and film thickness of the lower magnetic layer. In addition, the samples in this example exhibit very good recording-retrieving characteristics, with a medium S/N higher than 22 dB. It is worth noting that the sample in which the first underlayer is formed from Ni—Ta alloy exhibits a low normalized noise whereas the sample in which the first underlayer is formed from Ni—P alloy or Ni—Nb alloy exhibits a high resolution. The normalized noise herein is defined as NdHF/So, where NdHF denotes the medium noise which results from recording at the maximum linear recording density of 24.8 kFC/mm (631 kFCI) and So denotes the isolated read pulse output. The resolution herein is defined as SMF/So, where SMF denotes the read output which results from the linear recording density of 12.4 kFC/mm (which is half the maximum linear recording density) and So denotes the isolated read pulse output. The medium S/N is defined as 20·log (SMF/NdHF).

Figure 3:
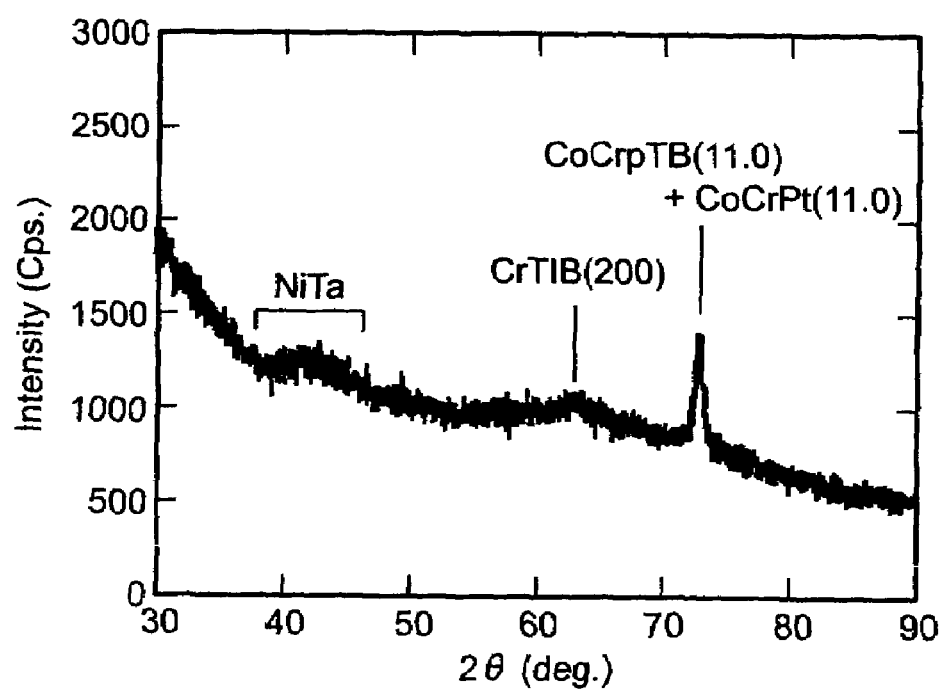
[FIG. 3]
Figure 4:
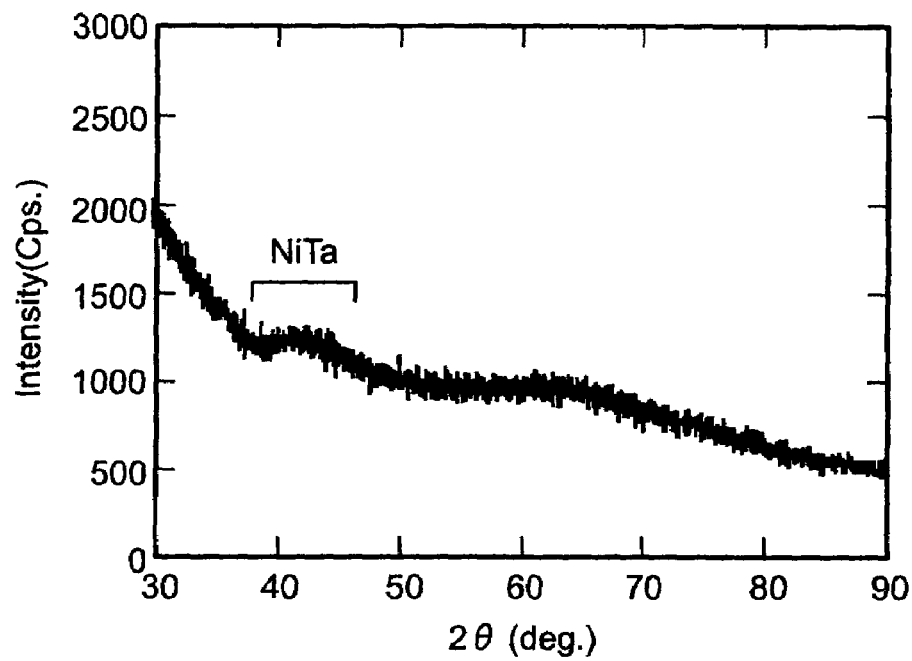
[FIG. 4]

The recording medium (designated as sample No. 101) gave an X-ray diffraction pattern shown in FIG. 3. The X-ray diffractometry was carried out with $CuK_{\alpha1}$ lines. It is noted that the X-ray diffraction pattern has a peak in the neighborhood of $2\theta=73°$, which is attributable to the (11·0) plane in the magnetic layer. A probable reason for this is that the magnetic layer has epitaxially grown on the Cr—Ti—B underlayer orienting in the (100) direction. The X-ray diffraction pattern has a very weak peak due to the (200) plane of the Cr—Ti—B underlayer, because this underlayer is as thin as 10 nm. For comparison, the same X-ray diffractometry as above was performed on a single-layer film (30 nm thick) formed at a room temperature from the Ni-45 at % Ta (which was used to form the first underlayer in the above-mentioned medium). The resulting X-ray diffraction pattern is shown in FIG. 4. The pattern has a broad halo peak at $2\theta=40\text{-}43°$. This suggests that the Ni—Ta alloy layer is of amorphous structure. Other recording media in this example all give the identical diffraction patterns, which indicates that their magnetic layer orients in the (11·0) direction and their first underlayer is of amorphous structure.

Figure 5:
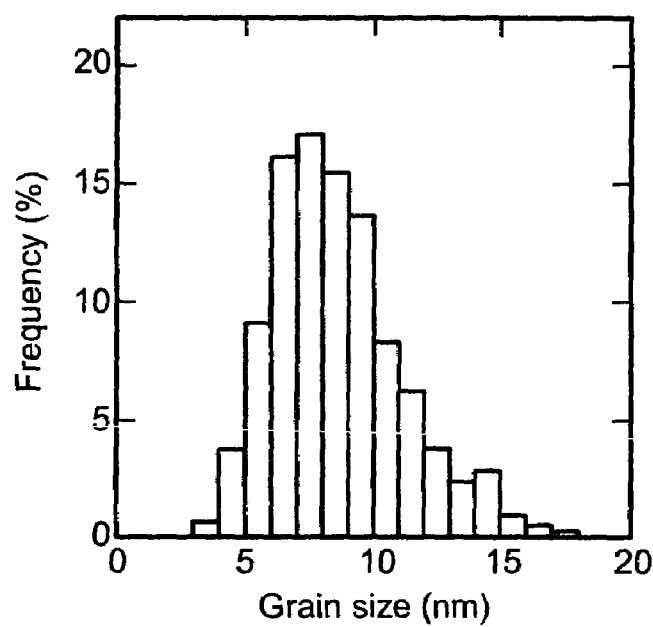
[FIG. 5]

The recording medium designated as sample No. 101 was examined for particles constituting its magnetic layer by observation under a transmission electron microscope (TEM) in the following manner. First, the surface lattice image is photographed with a magnification of about ×2,000,000, and the area of each crystal grain is calculated. One domain in which lattice stripes orient in the same direction is regarded as one crystal grain, and any crystal grain assuming the bicrystal structure (in which the adjacent c-axes are mutually perpendicular) is regarded as consisting of different crystal grains. Then, the profile of each crystal grain is hypothetically transformed into a complete circle equal in area, and the diameter of the circle is measured. The thus measured diameter is defined as the particle diameter of individual crystal grains. About 300 crystal grains are measured for particle diameter as mentioned above, and the arithmetic average of measured values is regarded as the average particle diameter. The particle diameters thus measured have a distribution represented by a histogram in FIG. 5. The average particle diameter is as small as 8.9 nm, and the standard deviation normalized with respect to the average particle diameter is 28%, which suggests a uniform variance of particle diameters.

COMPARATIVE EXAMPLE 1

Samples of recording media each having two underlayers were prepared as follows by repeating the procedure of Example 1. The process was started with cleaning and drying an aluminosilicate glass substrate. On the glass substrate was formed at room temperature a first underlayer of Ta (5-30 nm thick) or Ni-45 at % Ta (30 nm thick). With the substrate heated at about 240° C. by a lamp heater, a second underlayer of Cr-15 at % Ti-5 at % B was formed. After that, a magnetic layer and a carbon protective layer were sequentially formed, which are identical in composition and thickness to those in Example 1.

TABLE 2

| Sample No. | First underlayer | $H_c$ (kA/m) | $B_r \cdot t$ (T-nm) | $H_x$ (kA/m) | Resolution (%) | Normalized noise ($mV_{rms}/mV_{pp}$) | Medium S/N (dB) |
|---|---|---|---|---|---|---|---|
| 111 | Ta (30 nm) | 281 | 3.9 | 57 | 47 | 0.0417 | 21.0 |
| 112 | Ta (20 nm) | 278 | 4.0 | 52 | 48 | 0.0422 | 21.1 |
| 113 | Ta (10 nm) | 243 | 4.1 | 46 | 51 | 0.0477 | 20.6 |
| 114 | Ta (5 nm) | 209 | 4.1 | 39 | 51 | 0.0542 | 19.6 |
| 115 | Ni-45 Ta (30 nm) | 309 | 4.0 | 50 | 48 | 0.0417 | 21.2 |

Composition in terms of atomic %.

The comparative samples were examined for magnetic and recording-retrieving characteristics in the same way as in Example 1. The results are shown in Table 2. It is noted that those samples having a first underlayer formed from Ta (but lacking a first underlayer specified in Example 1) increase in both coercive force and medium S/N in proportion to the thickness of Ta underlayer. However, they are inferior in both magnetic and recording-retrieving characteristics to those samples in Example 1. This is true even for sample No. 113 which is best. On the other hand, sample No. 114, which has a first underlayer of Ni—Ta as with sample No. 101 in Example 1 but lacks a second underlayer specified in Example 1, is almost comparable in coercive force to sample No. 101 but is poor in resolution and lower in medium S/N by 2 dB or more.

EXAMPLE 2

Samples of recording media were prepared by coating a glass substrate (having its surface concentrically texturized) with three underlayers, two magnetic layers, and a carbon protective film sequentially formed thereon. A first underlayer (20 nm thick) was formed from any of Co-30 at % Cr-12 at % Zr, Co-30 at % V-12 at % Ta, Mo-30 at % Si, Nb-20 at % Si, Zr-15 at % Si, Cr-20 at % Zr, Cr-20 at % Ti, Cr-10 at % B, Ta-30 at % Si, and Ti-30 at % Si. A second underlayer (3 nm thick) was formed from Ta. With the substrate heated at 280° C. by a lamp heater, a third underlayer (8 nm thick) was formed from Cr-20 at % Ti-3 at % B. The magnetic layers were constructed in the same way as in Example 1.

TABLE 3

| Sample No. | First underlayer | $H_{cc}$ (kA/m) | $H_cOR$ | $H_x$ (kA/m) | Resolution (%) | Normalized noise ($mV_{rms}/mV_{pp}$) | Medium S/N (dB) |
|---|---|---|---|---|---|---|---|
| 201 | Co-30 Cr-12 Zr | 292 | 1.09 | 48 | 52 | 0.0401 | 22.3 |
| 202 | Co-30 V-12 Ta | 287 | 1.15 | 52 | 53 | 0.0422 | 22.0 |
| 203 | Mo-30 Si | 311 | 1.08 | 47 | 51 | 0.0415 | 21.8 |
| 204 | Nb-20 Si | 324 | 1.05 | 48 | 49 | 0.0402 | 21.7 |
| 205 | Zr-15 Si | 321 | 1.07 | 44 | 50 | 0.0408 | 21.8 |
| 206 | Cr-20 Zr | 302 | 1.09 | 51 | 51 | 0.0425 | 21.6 |
| 207 | Cr-20 Ti | 282 | 1.14 | 51 | 52 | 0.0419 | 21.9 |
| 208 | Cr-10 B | 305 | 1.09 | 47 | 51 | 0.0412 | 21.9 |
| 209 | Ta-30 Si | 318 | 1.06 | 54 | 49 | 0.0405 | 21.7 |
| 210 | Ti-30 Si | 320 | 1.06 | 53 | 50 | 0.0410 | 21.7 |

Composition in terms of atomic %.

The samples in this example were examined by X-ray diffractometry. As with sample No. 101 in Example 1, they all gave diffraction peaks due to the (11·0) plane of the magnetic layer and broad halo patterns due to the first lower underlayer. Table 3 shows the magnetic and recording-retrieving characteristics of the samples in this example.

$H_cOR$ is defined as $H_{cc}/H_{cr}$, where $H_{cc}$ denotes the coercive force which is measured when a magnetic field is applied in the circumferential direction and $H_{cr}$ denotes the coercive force which is measured when a magnetic field is applied in the radial direction. The samples were also tested for recording-retrieving characteristics by using a head in which Twr is 200 nm and Tww is 270 nm. All the samples gave an $H_cOR$ value higher than 1.05. This suggests that they have magnetic anisotropy introduced in the circumferential direction. The samples Nos. 201, 202, 206, 207, and 208 in which the first underlayer is formed from Co or Cr-based alloy are characterized by high $H_cOR$ values and a resolution higher than 51%. Also, the samples Nos. 203, 204, 209, and 210 in which the first underlayer is formed from Si-containing alloy are characterized by low normalized noise and good medium S/N higher than 21.7 dB although they have rather low $H_cOR$ values.

COMPARATIVE EXAMPLE 2

The same procedure as in Example 2 was repeated with the same equipment to produce samples of recording media having the same layer construction and composition, except that a first underlayer on the substrate is a single-layer film (30 nm thick) formed at room temperature from any of Zr, Ti, Mo, W, Cr, and V. This underlayer gave an X-ray diffraction pattern having one or more sharp peaks, suggesting that it is crystalline. Each sample of recording media thus obtained underwent X-ray diffractometry. The samples in which the first underlayer is formed from Ti, W, or V gave a diffraction pattern having peaks due to the (11·0) plane, (10·0) plane, and (00·1) plane of the magnetic layer. By contrast, the samples in which the first underlayer is formed from Zr, Cr, or Mo gave a diffraction pattern having only one peak due to the (11·0) plane of the magnetic layer. However, the peak intensity is lower by 30-50% than that of the sample in Example 2. The samples in this comparative example are much lower in $H_{cc}$ values than those in Example 2, as noted from Table 4. Presumably, this is because the magnetic layer has a weak orientation in the (11·0) direction, as mentioned above. In addition, the samples in this comparative example also have $H_cOR$ values lower than 1.05, which suggests that anisotropy in the circumferential direction is not effectively introduced. For this reason they are low in resolution and they are also lower in medium S/N by 2-3 dB than the samples in Example 2. Incidentally, the sample No. 212 (in which the first underlayer was formed from Ti) gave too low a retrieving output to permit the measurement of recording-retrieving characteristics.

TABLE 4

| Sample No. | First underlayer | $H_{cc}$ (kA/m) | $H_cOR$ | $H_x$ (kA/m) | Resolution (%) | Normalized noise ($mV_{rms}/mV_{pp}$) | Medium S/N (dB) |
|---|---|---|---|---|---|---|---|
| 211 | Zr | 273 | 1.02 | 51 | 46 | 0.0489 | 19.5 |
| 212 | Ti | 121 | 1.01 | 12 | — | — | — |
| 213 | W | 195 | 1.02 | 23 | 41 | 0.0486 | 18.5 |
| 214 | Mo | 254 | 1.04 | 20 | 45 | 0.0465 | 19.7 |
| 215 | Cr | 268 | 1.03 | 27 | 46 | 0.0491 | 19.4 |
| 216 | V | 196 | 1.04 | 22 | 42 | 0.0504 | 19.4 |

EXAMPLE 3

Samples of recording media were prepared in the following manner. An Al—Mg alloy substrate coated with an NiP plating film was concentrically texturized. On the substrate (heated at 280° C.) was formed a first underlayer (60 nm thick) from any of Ni-50 at % Al, Ni-50 at % Ti, Fe-50 at % Al, Fe-50 at % Ti, Fe-50 at % V, Co-50 at % Fe, Co-50 at % Ti, Co-50 at % Zr, Co-50 at % Al, Ru-50 at % Al, Mn-50 at % Al, and Mn-50 at % V. This underlayer was formed in two stages (for 30 nm thick each) by using two chambers. On the first underlayer were sequentially formed a second underlayer (5 nm thick) of Ta, an alloy layer (15 nm thick) of Cr-30 at % Mo-3 at % B, an alloy layer (3 nm thick) of Co-37 at % Cr, a magnetic layer, and a protective film. The magnetic layer is composed of a first magnetic layer (5 nm thick) of Co-19 at % Cr-10 at % Pt-4 at % B, an intermediate layer (0.7 nm thick) of Ru, and a second magnetic layer (22 nm thick) of Co-16 at % Cr-12 at % Pt-5 at % B-2 at % Cu.

Each sample was tested for magnetization, with a magnetic field applied in the circumferential direction. The $H_x$ was found to be 40-55 kA/m from the magnetization curve. This suggests the presence of antiferromagnetic coupling between the first and second magnetic layers. Table 5 shows magnetic properties and recording-retrieving characteristics.

TABLE 5

| Sample No. | First underlayer | $H_{cc}$ (kA/m) | $H_cOR$ | $K_u \cdot V/kT$ | Medium S/N (dB) |
|---|---|---|---|---|---|
| 301 | Ni-50 Al | 334 | 1.15 | 87 | 22.5 |
| 302 | Ni-50 Ti | 321 | 1.06 | 94 | 21.9 |
| 303 | Fe-50 Al | 318 | 1.15 | 90 | 22.0 |
| 304 | Fe-50 Ti | 325 | 1.13 | 92 | 21.9 |
| 305 | Fe-50 V | 333 | 1.14 | 88 | 22.3 |
| 306 | Co-50 Fe | 307 | 1.16 | 90 | 21.7 |
| 307 | Co-50 Ti | 311 | 1.10 | 88 | 21.6 |
| 308 | Co-50 Zr | 318 | 1.09 | 87 | 22.2 |
| 309 | Co-50 Al | 317 | 1.14 | 99 | 22.0 |
| 310 | Ru-50 Al | 329 | 1.21 | 102 | 22.4 |
| 311 | Mn-50 Al | 325 | 1.31 | 105 | 22.2 |
| 312 | Mn-50 V | 316 | 1.11 | 95 | 22.3 |

Composition in terms of atomic %.

In Table 5, Ku·v/kT is a parameter defined as follows.
$K_u$: constant of magnetocrystalline anisotropy
v: volume of magnetic crystal grain
k: Boltzmann constant
T: absolute temperature As shown in cf. J. Magn. Magn. Mater. 127, p. 233 (1993), it was obtained from Sharrock's formula to which was fitted the time dependence of residual coercive force at room temperature in a period ranging from 7.5 to 240 seconds. The present inventors' investigation revealed that if the thus obtained parameter has a value larger than about 85, then the magnetic recoding medium is free from output decrease due to thermal fluctuation and hence is sufficiently reliable. The samples of recording media all have Ku·v/kT of 85 or more, which is sufficiently stable for thermal fluctuation. Moreover, good medium S/N higher than 21.7 dB was obtained.

EXAMPLE 4

Samples of recording media were prepared in the following manner. A substrate of soda lime glass with a chemically reinforced smooth surface was prepared. On the substrate (heated at 100° C.) was formed a first underlayer (22 nm thick) from any of Co-30 at % Cr-8 at % Nb, Co-30 at % Cr-10 at % Ti, Co-30 at % Cr-8 at % W, Co-34 at % Mn-12 at % Mo, Co-34 at % Mn-10 at % B, Co-10 at % V-8 at % Si, Cr-40 at % Ta, and Cr-15 at % Si. Further, a second underlayer (4 nm thick) was formed from Ta. With the first and second underlayers formed thereon, the substrate was removed from the vacuum chamber and had its surface concentrically texturized. The substrate was placed again in the vacuum chamber and heated to 220° C. by means of a lamp heater. On the substrate were sequentially formed an alloy layer (5 nm thick) of Cr-10 at % Ti-7 at % B, an alloy layer (5 nm thick) of Cr-20 at % W, a magnetic layer (specified below), and a carbon protective film (4.5 nm thick). The magnetic layer is composed of a first magnetic layer (4 nm thick) of Co-15 at % Cr-8 at % Pt-10 at % B, a second magnetic layer (4 nm thick) of Co-15 at % Cr-8 at % Pt-10 at % B, and a third magnetic layer (24 nm thick) of Co-18 at % Cr-12 at % Pt-6 at % B-2 at % Cu. These magnetic layers are separated from each other by an intermediate layer (0.7 nm thick) interposed between them.

TABLE 6

| Sample No. | First underlayer | $H_{cc}$ (kA/m) | $H_cOR$ | Medium S/N (dB) | Rate of output decrease (%) |
|---|---|---|---|---|---|
| 401 | Co-30 Cr-8 Nb | 348 | 1.22 | 21.6 | 0.92 |
| 402 | Co-30 Cr-10 Ti | 351 | 1.31 | 22.0 | 0.75 |
| 403 | Co-30 Cr-8 W | 333 | 1.28 | 21.5 | 0.95 |
| 404 | Co-34 Mn-12 Mo | 345 | 1.25 | 21.8 | 0.81 |
| 405 | Co-34 Mn-10 B | 339 | 1.28 | 21.4 | 0.85 |
| 406 | Co-10 V-8 Si | 342 | 1.27 | 21.3 | 0.99 |
| 407 | Cr-40 Ta | 346 | 1.33 | 21.9 | 0.81 |
| 408 | Cr-15 Si | 344 | 1.35 | 22.4 | 0.76 |

Composition in terms of atomic %.

Figure 6:
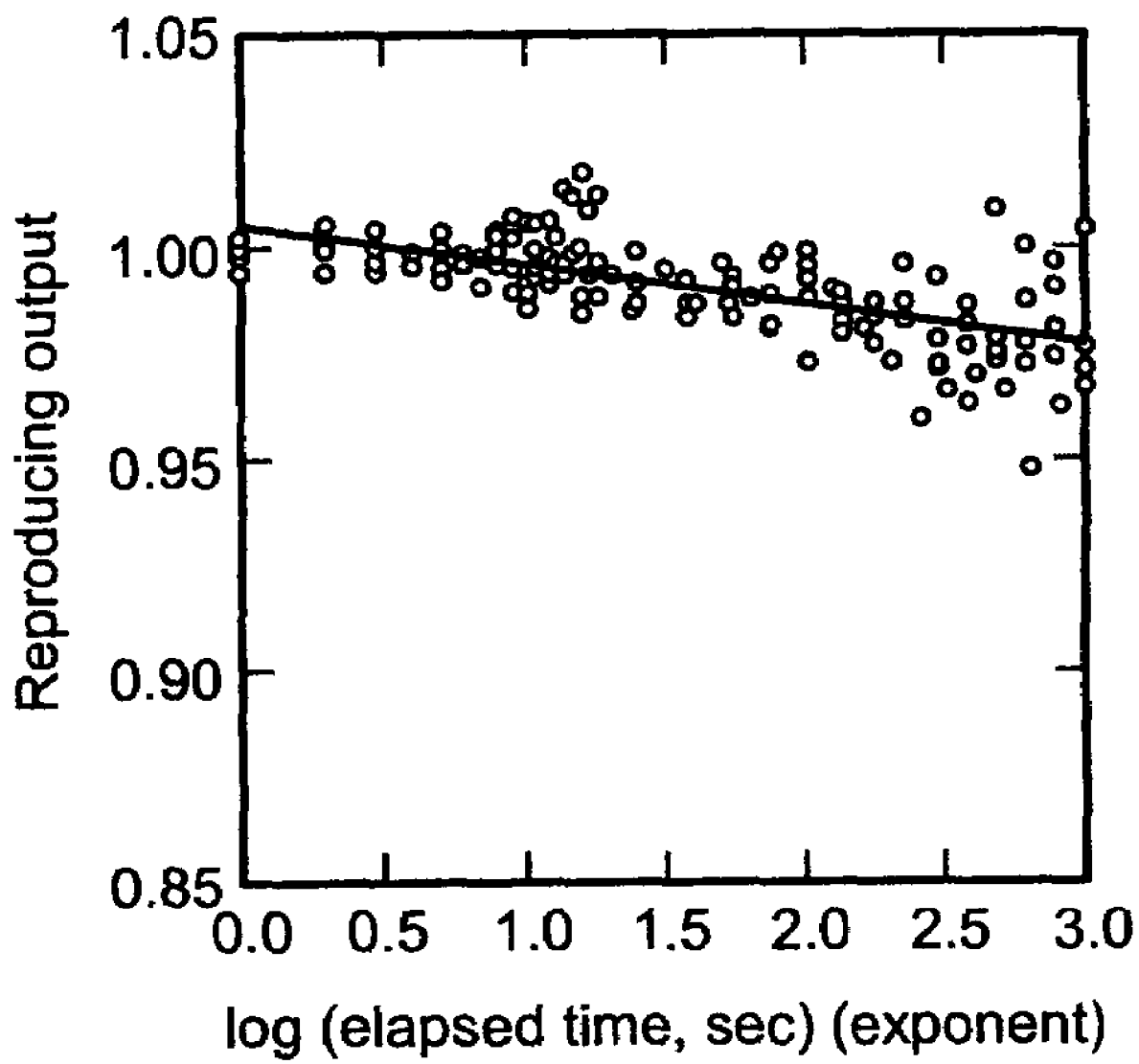
[FIG. 6]

It is noted from Table 6 that all the samples in this example gave $H_{cc}$ values higher than 330 kA/m and $H_cOR$ values higher than 1.2. The samples in this example have higher $H_cOR$ values than those of Example 2 in which the glass substrate has its surface directly texturized. This suggests that texturizing that is performed after the underlayer has been formed is more effective in increasing the $H_cOR$ values. In addition, the samples in this example all gave good medium S/N (higher than 21.6 dB) measured in the same way as in Example 2. FIG. 6 shows how the sample No. 401 changes in retrieving output with time. This data was obtained by measuring signal strength continuously over a period of 1000 seconds after recording at a linear recording density of 15.7 kFC/mm on the recording medium placed in a thermostat at 65° C. It is noted that the rate of decrease in retrieving output in the case of sample No. 401 is 0.95% per exponent. Other samples also gave a rate of decrease in retrieving output smaller than 1% per exponent. This result suggests that the samples in this example are thermally stable.

EXAMPLE 5

Figure 7:
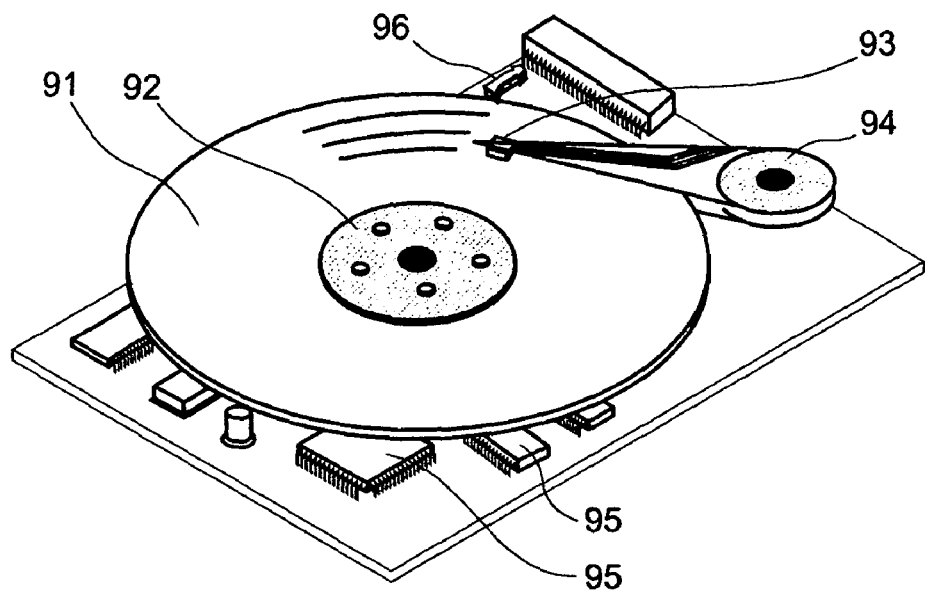
[FIG. 7]

Each of the samples Nos. 101, 201, 204, 208, 209, 301, 310, and 401 in Examples 1 to 4 was incorporated into the magnetic recording apparatus shown in FIG. 7. This apparatus comprises a magnetic recording medium 91, a drive unit 92 to drive it, a magnetic head 93 including a recording part and a retrieving part, a means 94 to move the magnetic head relative to the magnetic recording medium, a signal processing means 95 for input to and output from the magnetic head, and a mechanism 96 for the magnetic head to retract at the time of unloading.

Figure 8:
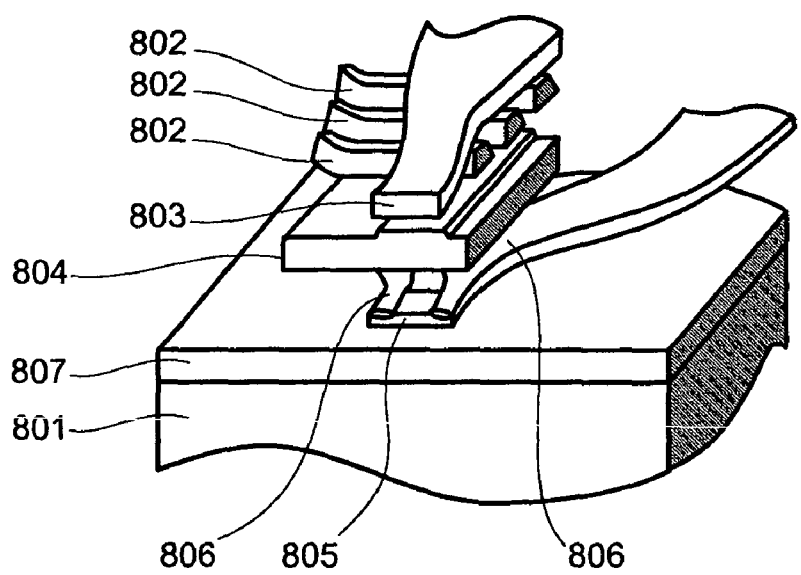
[FIG. 8]

The magnetic head is constructed as schematically shown in FIG. 8 (perspective view). It is a compound head including a recording head of electromagnetic induction type and a retrieving head of magneto-resistive effect type, both formed on a substrate 801. The recording head includes an upper recording magnetic pole 803 and a lower recording magnetic pole (functioning also as an upper shield layer) 804, with a coil 802 interposed between them. These recording magnetic poles are separated from each other by a gap of 120 nm. The coil is formed from 1.5-µm thick copper film. The retrieving head includes a magnetoresistive sensor 805 and two electrode patterns 806 placed at both sides thereof. The magneto-resistive sensor 805 is held between the upper shield layer 804 (functioning also as the lower recording magnetic pole) and the lower shield layer 807. These shield layers are 80 nm apart from each other. There is a gap layer between the recording magnetic poles, and there is also a gap layer between the shield layer and the magneto-resistive sensor; however, these gap layers are omitted in FIG. 8.

Figure 9:
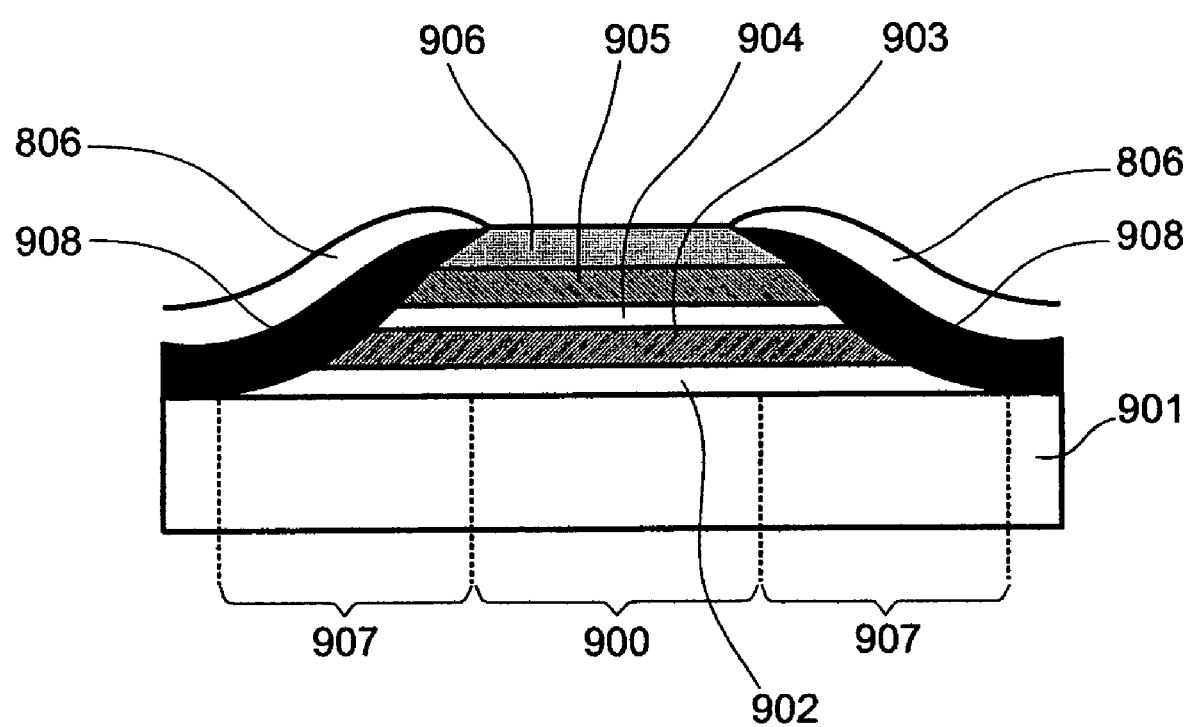
[FIG. 9]

The magneto-resistive sensor has a sectional structure as shown in FIG. 9. It has a signal detecting region 900 which includes a plurality of conducting magnetic layers and a magneto-resistive sensor (or retrieving element of spin valve type which is placed between the conducting magnetic layers. The conducting magnetic layers relatively change in their respective magnetization directions in response to the external magnetic field, thereby producing a large resistance change. The magneto-resistive sensor has a gap layer 901, a Ta buffer layer 902, a lower magnetic layer 903, a copper intermediate layer 904, an upper magnetic layer 905, and an antiferromagnetic layer 906 of Pt—Mn alloy, which are sequentially formed one over another. The lower magnetic layer is formed from Ni-20 at % Fe alloy and the upper magnetic layer is formed from cobalt. The upper magnetic layer is fixedly magnetized in one direction owing to the exchange magnetic field from the antiferromagnetic layer. In contrast, the lower magnetic layer, which is in contact with the upper magnetic layer with a non-magnetic layer interposed between them, varies in its direction of magnetization due to leakage magnetic field from the magnetic recording medium, and this gives rise to resistance change. The signal detecting region has its both ends tapered. The tapered parts 907 have a pair of permanent magnet layers 908 (which make the lower magnetic layer single domain structure) and a pair of electrodes 806 to take out signals which are formed on the permanent magnet layers 908. The permanent magnetic layer is formed from Co—Cr—Pt alloy so that it has a large coercive force and remains stable in the direction of easy magnetization.

The magnetic head used in this example is that of magneto-resistive effect type which is formed on a magnetic head slider weighing 2 mg or less and having a flying surface rail area smaller than 1.4 mm². The magnetic head as specified above has improved shock resistance as well as high recording density. In fact, it realized a mean time between failures (MTBF) longer than 300,000 hours for a recording density higher than 70 megabits/mm².

From the foregoing it will be appreciated that the embodiments as disclosed above has an improved medium S/N ratio as well as good thermal stability. When combined with a magnetic head of magneto-resistive effect type, it permits an areal recording density exceeding 70 megabits/mm² with an MTBF longer than 300,000 hours.

We claim:

1. A recording medium which comprises a non-magnetic substrate and a magnetic layer formed thereon with three underlayers interposed between them, said magnetic layer being composed of a plurality of layers of Co-based alloy of hexagonal close-packed structure which are antiferromagnetically coupled to one another through a non-magnetic intermediate layer, said three underlayers including a first one of amorphous alloy, a second one of Ta, and a third one of Cr-based alloy of body-centered cubic structure, wherein the first underlayer is composed of Co as the principal component and at least one element selected from Zr, Ta, Nb, Ti, W, Mo, B, and Si in a total amount no less than 5 at % and no more than 60 at %.

2. A recording medium as in claim 1, wherein the first underlayer is composed of Ni as the principal component and at least one element selected from Ta, Nb, Zr, and Ti, in a total amount no less than 5 at % and no more than 60 at %.

3. A recording medium as in claim 1, wherein the first underlayer is composed of Cr as the principal component and at least one element selected from Ti, Zr, Ta, B, and Si in a total amount no less than 5 at % and no more than 60 at %.

4. A recording medium which comprises a non-magnetic substrate and a magnetic layer formed thereon with three underlayers interposed between them, said magnetic layer being composed of a plurality of layers of Co-based alloy of hexagonal close-packed structure which are antiferromagnetically coupled to one another through a non-magnetic intermediate layer, said three underlayers including a first one of amorphous alloy, a second one of Ta, and a third one of Cr-based alloy of body-centered cubic structure, wherein the first underlayer is composed of Co as the principal component and at least one element selected from Zr, Ta, Nb, Ti, W, Mo, B, and Si in a total amount no less than 5 at % and no more than 60 at %,
wherein the first underlayer is composed of at least one element selected from Nb, Zr, Ta, Mo, and Ti as the principal component and Si in an amount no less than 5 at % and no more than 50 at %.

5. A recording medium as in claim 1, wherein the first underlayer is composed of Ni—Ta alloy.

6. A recording medium comprising a non-magnetic substrate and a magnetic layer formed thereon with three underlayers interposed between them, said magnetic layer being composed of a plurality of layers of Co-based alloy of hexagonal close-packed structure which are antiferromagnetically coupled to one another through a non-magnetic intermediate layer, said three underlayers including a first one of alloy of B2 structure, a second one of Ta, and a third one of Cr-based alloy of body-centered cubic structure.

7. A recording medium as in claim 2, the third one of Cr-based alloy of body-centered cubic structure is composed of Cr—Ti—B alloy.

8. A recording as in claim 2, wherein the magnetic layer substantially has a crystal form such that the (11·0) plane orients approximately parallel to the substrate surface.

9. A recording as in claim 2, wherein the magnetic layer is composed of particles having an average particle diameter no larger than 10 nm measured in the direction approximately parallel to the substrate surface.

10. A recording as in claim 2, wherein the magnetic layer has a coercive force (Hcc) measured in the circumferential direction and a coercive force (Hcr) measured in the radial direction such that the ratio of Hcc/Hcr is no smaller than 1.05.

* * * * *